United States Patent [19]

Arenson

[11] 3,993,786

[45] Nov. 23, 1976

[54] PREPARING CHEESE SLICES THAT DO NOT ADHERE

[76] Inventor: Simon Weil Arenson, 6602 Copper Ridge Drive, Baltimore, Md. 21209

[22] Filed: Apr. 14, 1975

[21] Appl. No.: 567,808

Related U.S. Application Data

[63] Continuation-in-part of Ser. No. 530,398, Dec. 6, 1974, abandoned.

[52] U.S. Cl. ................................. 426/99; 426/274; 426/289; 426/294; 426/582
[51] Int. Cl.² .................. A23C 19/02; A23C 19/16
[58] Field of Search .......... 426/289, 292, 294, 273, 426/274, 89, 99, 98, 302, 307, 582, 588

[56] References Cited
UNITED STATES PATENTS

| | | | |
|---|---|---|---|
| 1,445,786 | 2/1923 | Meyers | 426/273 |
| 2,065,675 | 12/1936 | Fechner | 426/98 X |
| 2,279,202 | 4/1942 | Musher | 426/307 X |
| 2,684,905 | 7/1954 | Grindrod | 426/273 X |
| 2,684,906 | 7/1954 | Grindrod | 426/273 X |
| 2,931,729 | 4/1960 | Green | 426/273 |
| 2,971,846 | 2/1961 | Greer | 426/273 X |
| 3,389,000 | 6/1968 | Fujiba et al. | 426/99 |
| 3,390,001 | 6/1968 | Beck | 426/294 |
| 3,769,039 | 10/1973 | Kleinert | 426/289 X |
| 3,881,029 | 4/1975 | Arenson | 426/289 X |

*Primary Examiner*—S. Leon Bashore
*Assistant Examiner*—Kenneth M. Schor
*Attorney, Agent, or Firm*—Pollock, Vande Sande & Priddy

[57] ABSTRACT

A method of providing cheese slices that do not adhere together wherein there is used a composition of matter consisting of a fat material in powder form applied to one or both sides of each cheese slice.

13 Claims, 3 Drawing Figures

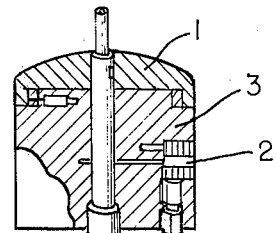
FIG. 1.
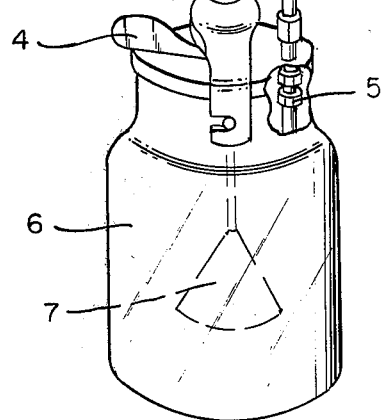
FIG. 3.
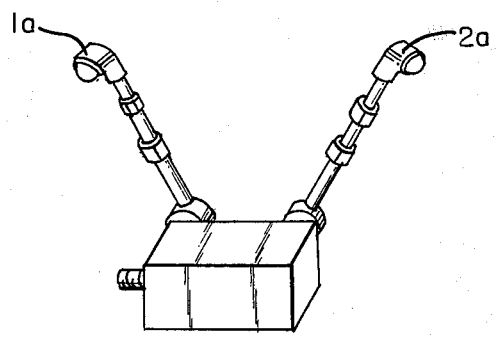
FIG. 2.
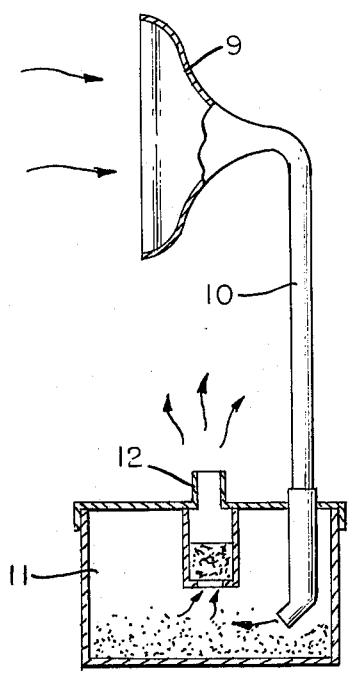

PREPARING CHEESE SLICES THAT DO NOT ADHERE

This is a continuation in part of my prior copending U.S. patent application, Title: Preparing Cheese Slices That Do Not Adhere; Ser. No. 530,398, filed 12-06-74 and now abandoned.

BACKGROUND OF THE INVENTION

Practically every country has its own particular cheeses. Cheese may be classified under two headings those in which the curdling is due primarily to the action of rennit and are termed natural and those in which the curdling is due primarily to acid producing bacteria and are termed processed.

The availability of natural and processed cheese and cheese foods sliced and in unit weight packages has increased the sales of cheeses in this and in other countries.

The most popular cheese sold in the United States of America is domestic cheddar termed American.

American cheese is available packaged in slices as natural and as pasteurized processed and as pasteurized cheese food types.

Natural cheese slices are packaged stacked one slice atop the other without any separating barrier between them. Pasteurized processed cheeses and pasteurized processed cheese food slices are packaged one slice atop another slice each slice in an envelope. Pasteurized processed cheese slices and pasteurized processed cheese food slices will adhere if stacked one slice atop the other slice without any barrier between them and will lose water and will not remain fresh during its shelf life period.

Chart No. 1 lists the water content of natural cheese at 37.0 percent, pasteurized processed cheese at 40.0 percent and pasteurized processed cheese food at 43.2 percent.

Variations in temperatures that normally occur during refrigeration causes natural cheese slices packaged stacked one atop the other without any barrier between each slice to adhere.

CHART NO. 1

Cheeses, natural and processed; cheese foods

| | Percent | | | | |
|---|---|---|---|---|---|
| | Water | Protein | Fat | Ash | Carbohydrate |
| Natural cheeses Item 646 Cheddar domestic type | | | | | |
| commonly called American | 37.0 | 25.0 | 32.2 | 3.7 | 2.1 |
| Pasteurized process cheese Item 653 American | 40.0 | 23.2 | 30.0 | 4.9 | 1.9 |
| Item 654 Pimento (American) | 40.0 | 23.0 | 30.2 | 5.0 | 1.8 |
| Pasteurized process cheese food American Item 656 American | 43.2 | 19.8 | 24.0 | 5.9 | 7.1 |

Items listed in Composition of Foods U.S.D.A. Handbook No. 8, Page 22.

Natural cheese slices have low water content and when eaten directly from refrigeration are dry to the taste and are not flavorful. When they are heated the slices are tough to the taste because they have lost water and lack proper flavor.

When the water content of natural cheese is raised in the process to 40 and to 43.2 percent water contents its slices at both water contents are as flavorful as pasteurized processed cheese slices and pasteurized processed cheese food slices. The slices will adhere if packaged stacked one atop the other slice without any barrier between them. The slices will become dry from loss of water also.

Both the composition of the fatty acids described in chart No. 2 in the milk fat and in the cream fat physical characteristics are influenced by the food intake of the cow as well as by the season of the year and the animal strain. There is a pronounced seasonal change in fatty acid composition of the milk fat. The softening point and the melting point of the milk fat vary with its percentage of saturated and unsaturated fatty acids. The milk fat is more firm when the percentage of saturated fatty acids predominate and are less firm when the saturated fatty acids are low and the unsaturated fatty acids predominate. Variations from season to season in composition of the fatty acids and the effect of the variations on the milk fat physical characteristics make it difficult to prepare stacked sliced cheese made with the fat as a component part that will not adhere and that will be flavorful. Information in chart No. 2 relating to variations in butter fat fatty acids point out the problem.

Characteristics and fatty acid composition of butter fat

| | Jack and co-workers (3) | Hilditch and Jasperson (4) | Range of values | Hilditch and Jasperson (4) | GLC |
|---|---|---|---|---|---|
| Analysis | | | | | |
| Characteristics | | | | | |
| Iodine number | 32.9 | 37.05 | | 42.9 | |
| Saponification equiv. | 236.3 | 247.7 | | 251.8 | |
| Reichert-Meisel | 32.5 | 26.1 | | 27.4 | |
| Polenske value | | 1.85 | | 1.78 | |
| Kirschner value | | 21.8 | | 21.8 | |
| Composition | | | | | |

-continued

Characteristics and fatty acid composition of butter fat

| | Jack and co-workers (3) | Hilditch and Jasperson (4) | Range of values | Hilditch and Jasperson (4) | GLC |
|---|---|---|---|---|---|
| Analysis of fatty acids, Wt.% | | | | | |
| butyric | 3.5 | 3.6 | 2.8–4.0 | 3.7 | 3 |
| caproic | 0.4 | 2.0 | 1.4–3.0 | 1.7 | 1 |
| caprylic | 1.7 | 0.5 | 0.5–1.7 | 1.0 | 1 |
| lauric | 2.6 | 2.3 | 1.7–3.2 | 1.9 | 3 |
| myristic | 14.6 | 11.1 | 5.4–14.6 | 8.1 | 4 |
| palmitic | 30.2 | 29.0 | 26–41 | 25.9 | 12 |
| stearic | 10.5 | 9.2 | 6.1–11.2 | 11.2 | 29 |
| above C18 | 1.6 | 2.4 | 1.2–2-4 | 1.2 | 11 |
| Total saturated | 70.6 | 62.6 | | 57.5 | 66 |
| decenoic | 0.3 | 0.1 | 0.1–0.3 | 0.1 | |
| dodecenoic | 0.2 | 0.1 | 0.1–0.3 | 0.2 | |
| tetradecenoic | 1.5 | 0.9 | 0.6–1.6 | 0.6 | |
| hexadecenoic | 5.7 | 4.6 | 2.8–5.7 | 3.4 | 4 |
| octadecenoic (oleic ect) | 2.1 | 3.6 | 0.9–3.7 | 3.7 | 2 |
| | 18.7 | 26.7 | 18.7–33.4 | 32.8 | 27 |
| unsaturated c20 and c22 | 0.9 | 1.4 | 0.7–30 | 8–30 | 1 |
| Total Unsaturated | 29.4 | 37.4 | | 42.5 | 34 |

References:
J. L. Henderson & E. L. Jack, Oil and soap 21,90–92 1944(3)
T. P. Hilditch & H. Jasperson J. Soc. Chem Ind. 60-305-310 1941 (4)
GLC see S. Dal Nogare in Organic analysis vol 4 interscience New York 1960
Crediting Bailey's Industrial Oil And Fat Products 3rd ed. interscience publishing co. page 168.

An object of the invention is to provide a method to replace the envelope in which each cheese slice is enclosed and to prevent them from adhering.

Another object of the present invention is to provide a method to prevent cheese slices from adhering during refrigeration when they are stacked one atop the other without any non food barrier between them.

Another object of the present invention is to provide cheese slices that when refrigerated do not adhere together and lose at most a minimum amount of water.

Another object of the present invention is to provide cheese slices that when refrigerated do not adhere together by employing a method that is economical to utilized and efficient to carry out.

This and other objects of this invention will become apparent from a reading of the following specifications and claims.

SUMMARY OF THE INVENTION

The present invention is directed to a method of preventing cheese slices from adhering to one another during refrigeration when packaged stacked one slice atop another slice with no non food barrier between each slice by applying a coating of hardened fat in powder form to at least one contacting surface of each slice in an amount at least sufficient to prevent the cheese slices from adhering to one another during refrigeration. In addition the process of the present invention makes it possible to provide cheese slices which maintain their freshness during their expected shelf life period.

DESCRIPTION OF PREFERRED EMBODIMENTS

The fat material employed according to my invention must be in powder form and can be obtained from any source. While I prefer in practice of my invention to apply powder made from anhydrous milk fat which is the same fat that is in the cheese I can use powders made from other fats. I can use oils or fats obtained from vegetables, marine, mineral, or synthetic sources. I can use animal fats as well in powder form.

To replace the envelope in which some cheese slices are enclosed and to allow the increase in water processed into natural cheese and other cheeses that are stacked without a barrier between them I preferably apply a powdered milk fat to one or to both sides of the cheese slice. The powder is preferably prepared from hardened fat from milk, cream or butter.

The fats in powder form employed in accordance with the present invention generally have an iodine value of from 0 to about 20, a melting point at least about 105° F. and a softening point of about at least 37° F. In addition the fats should remain in powder form below 85° F. and preferably below 95° F. In addition these fats in powder form having a Wiley melting point between about 105° F and about 120° F, and a softening point between about 37° F. and about 46° F. perform satisfactorily in my process.

The preferred fats in powder form to be employed in my process have iodine values between about 3 to about 10, melting points between about 105° F. and about 1150° F., and a softening point between about 40° F. and about 44° F. The most preferred fats in powder form to be employed in my invention have an iodine value between about 5 and about 10, a melting point between about 105° F. and about 110° F. and a softening point between about 40° F. and about 42° F.

To obtain substantially uniform coating over substantially the entire surface of the cheese slice usually powders having a particle size small enough so that 100 percent will pass through a U.S. No. 30 sieve at 10° F. are employed. Preferably at least about 75 percent of the particles employed will pass through a U.S. No. 70 sieve at 10° F. The minimum particle size of the powders is not particularly crucial and is primarily dependant upon production and economical considerations.

Fat obtained from milk, cream, or butter can be treated in different ways and provide a hardened fat that when converted into a powder form will have satisfactory requirements for use in my process described in this application.

In one process the fat is first hardened by hydrogenation, a term used to denote a well known commercially used process described in Bailey's Industrial Oil and Fat Products 3rd edition pages 793–896 D. Swern Editor. The hydrogenated milk fat can be blended with anhydrous milk fat in varying percentages calculated to provide fats having lower desired melting and softening points.

In another process that can be used the high melting fractions of milk fat are separated from the lower melting fraction by cooling the melted fat under conditions that will separate the higher and lower fractions into layers that can be separated by centrifugation or other means. The hard fraction of the fat can be added to anhydrous milk fat and provide a fat having in powder form required characteristics when used in the process described in this application. This type of product is described in Bailey's Industrial Oil and Fats Third edition pages 881–882 item (7.3) D. Swern Editor. Some average typical characteristics of anhydrous milk fat:

| | |
|---|---|
| Iodine value | 32.9–37.5 |
| Free fatty acids | 0.3% maximum |
| Wiley melt point | 98.6° F. – 100.9° F. |
| Softening point | 38.5° F. – 42° F. |

Some average typical characteristics of anhydrous fat after hydrogenation:

| | |
|---|---|
| Iodine value | 10–3 |
| Free fatty acids | 0.3% maximum |
| Wiley melt point | 115° F. – 117.5° F. |
| Softening point | 42° F. – 46° F. |

The hardened milk fat in hot liquid form is sprayed into an atmosphere where the temperature is maintained at below 35° F. least amount of energy is required to maintain the atmosphere at the required temperature when the melted milk fat is at the lowest temperature that will maintain it in the liquid form. As the fat congeals into a fine powder form it can be removed from the atmosphere and packaged. The packaged powder should be maintained at below 25° F. until and during its application to the cheese slices.

Hardened milk fat granulation characteristics
Equipment used
Ro-Tap Used
Sieves used
U.S. number 30
U.S. number 50
U.S. number 70
U.S. number 100
U.S. number 200
Testing temperature 10°–15° F.
Time product in shaker 15 minutes
100 percent passed through U.S. number 30 sieve
75 percent passed through number ₵sieve
The equipment and procedure are listed in handbook number 53 pages 14–15 Tyler testing sieves 1972 edition W. S. Tyler Inc.

Charts three and four show the influence of the powder on the moisture loss of cheese slices and on their release during refrigeration when they are packaged one atop the other without any barrier between them. Chart No. 3 shows the influence of powdered hardened milk fat applied to pasteurized processed cheese slices on their adherence during the refrigeration period when the slices are not separate with any barrier between each slice or enclosed individually.

| | Adherence status | |
|---|---|---|
| Time | Coated Slices | Uncoated Slices |
| After 1 Week | Perfect release | Adhered |
| After 2 Weeks | Perfect release | " |
| After 3 Weeks | Perfect release | |
| After 4 Weeks | Perfect release | |
| After 5 Weeks | Perfect release | |
| After 6 Weeks | Perfect release | |

Legend:
Individually enclosed cheese slices were removed from their enclosures and coated with about 0.1 percent hardened milk fat in powder form and stacked in piles of 10 with no barrier except the powder between each slice. Each pile of 10 slices were placed in a 5½ by 6¼ plastic non rigid bag like the bags commonly used in households to contain sandwiches. 36 packages containing 10 slices in each package were prepared. The 36 packages were divided into groups of 6. Each stack was held under refrigeration at about 39°–41° F. during the 6 week test time period. Each week for a 6 week period the bottom package was removed from one stack that contained 6 packages. The slices were tested for ease of release. Uncoated slices packaged the same way were used as a control.

Chart No. 4 shows the influcence of powdered hardened milk fat applied to pasteurized procesed cheese slices on their moisture retention after the slices have been removed from their protective envelopes in comparison with pasteurized processed cheese slices removed from their individual envelopes and are not coated.

| Sample | Original weight | Moisture Loss % | Final weight |
|---|---|---|---|
| Pasteurized Processed slices not coated | 240 gms. 10 slices | 7.9 | 221.75 gms. |
| Pasteurized Cheese slices coated | 240.24 gms. | 0.19 | 239.8 gms. |

Legend:
Test time one (1) hour
Test conditions 72° F. temperature 68% RH

TEST PROCEDURE

Twenty cheese slices were removed from their envelopes. Ten cheese slices were coated with 0.1 percent powdered hardened milk fat. Ten cheese slices were not coated. Coated slices were placed on a screen balance pan and weighed. Another weight was made at the end of 1 hour. The same procedure was used with the uncoated slices.

I can apply the powder in my powder coating process such as by applying it first to one side by passing it on a belt through a curtain of the powder falling in a known amount then passing it under an exhaust arm that removes any excess powder that has not adhered. The slice would then be turned onto a second belt and the process repeated. This is the powder coating process I disclosed in my method for preventing food products and particularly hamburgers from adhering according to my U.S. Pat. No. 3,881,029 U.S.A.

The cheese slices are smooth and I prefer to apply the powder by spraying using a process that applies the powder in a known and uniform amount and in which the powder not adhered like the amount in excess of that which uniformly coat substantially the entire surface of the slice is retrieved and reused.

The process of applying the powder by spraying it on to one side of the cheese slice and then on to the other side of the slice is carried out by using assembly FIG. 1 to hold and convey the powder, nozzles FIG. 2 to apply the powder and exhaust unit FIG. 3 to trap the powder that does not adhere for reuse.

Powder holding tank FIG. 1 (6) holds the quantity of powder that is required for a unit operation time. Self locking lid FIG. 1 (4) keeps out foreign atmosphere. Compressed air forces the powder up through the pipe assembly FIG. 1 (7) Ratchet FIG. 1 (1) ring cap allows metering of the powder in known amounts by adjusting needle valve FIG. 1 (2) in the pipe assembly. Check valve FIG. 1 (5) prevents back pressure from clogging carburetor, pressure regulator and powder lines. Carburetor body structure assures long lasting uniform action FIG. 1 (3).

Pipe assembly FIG. 1 (7) is connected with the spray system with tubing (not shown) FIG. 2. The spray head system is completely flexible on all axes and the spray pattern is adjustable so the powder covers the slice area. Manifold extensions have positive locking devises to prevent accidental movement of heads. Each manifold swings in 90° arc and each spray head 1a and 2a FIG. 2 swivels in a 360° arc and 15° forward and backward.

Exhaust unit FIG. 3 takes in powder not adhered. It is made up of receiving arm 9 conveying tube 10 and receiving tank 11.

In the process the powder in tank 6 FIG. 1 is forced by air pressure through pipe assembly 7 FIG. 1 into the spray nozzles 1a and 2a FIG. 2 through the manifold to which they are attached. Spray nozzles are positioned so that nozzle 1a applies the powder to one side of the cheese slice and nozzle 2a applies the powder to the cheese other side. The powder that does not adhere passes into exhaust arm 9 FIG. 3 to tube 10 FIG. 3 and into tank 11 FIG. 3. Exhaust air moves out through 12 FIG. 3.

The above defined apparatus can be maintained at temperatures of about 25° F. or less to assure that the temperature of the powder remains at about 25° F. or less by various means when desired. For instance frozen carbon dioxide (dry Ice) can be placed in tank 6 or a coolant fluid such as cooled nitrogen gas, carbon dioxide gas, or water can be applied to the outer surface of each unit through coils around the units.

Having described my invention what I claim and desire to secure letters patent is:

1. A method of preventing cheese slices from adhering to one another during refrigeration when packaged stacked one slice atop another slice with no non-food barrier between each slice comprising applying a coating of hardened fat in powder form to at least one contacting surface of each slice in an amount sufficient to prevent the cheese slices from adhering to one another during refrigeration and to inhibit loss of moisture in the cheese slices.

2. The method of claim 1 wherein said fat is hardened milk fat or hardened cream fat.

3. The method of claim 1 wherein said cheese slices are natural cheese slices having the same water content as pasteurized cheese slices, and said fat is hardened milk fat or hardened cream fat.

4. The method of claim 1 wherein said fat is hardened milk fat or hardened cream fat having a melting point of at least about 105° F., a softening point of at least about 37° F. and an iodine value of from 0 to about 20.

5. The method of claim 1 wherein said fat is hardened milk fat having a melting point of about 105° F. to about 120° F. a softening point of about 37° F to about 46° F. and an iodine value of 0 to about 20; and wherein the fat remains in powder form at temperatures below about 85° F.

6. The method of claim 1 wherein said fat is hardened milk fat or hardened cream fat having an iodine value between about 3 and about 10, a melting point between about 105° F. and about 115° F. and a softening point between about 40° F. and about 44° F.

7. The method of claim 1 wherein said fat is hardened milk fat or hardened cream fat having an iodine value between about 5 and about 10, a melting point between about 105° F. and about 110° F. and a softening point between about 40° F. and about 43° F.

8. The method of claim 1 wherein the fat is a hardened milk fat or cream fat wherein 100 percent of the particles pass through a U.S. number 30 sieve and at least 75 percent pass through a U.S. number 70 sieve at 10° F.

9. The method of claim 1 wherein the hardened fat in powder form is sprayed onto the cheese slices.

10. The method of claim 1 wherein the hardened fat in powder form is sprayed onto both contacting surfaces of cheese slices substantially simultaneously.

11. The method of claim 1 wherein the hardened fat in powder form is hardened milk fat or cream fat which contains hydrogenated milk fat or hydrogenated cream fat.

12. A cheese slice coated with a hardened fat in powder form in an amount at least sufficient to prevent adherence of said slice to another slice of cheese during refrigeration and to at most lose a minimum amount of water, wherein said fat is hardened milk fat or hardened cream fat having a melting point of at least 105° F, a softening point of at least 37° F and an iodine value of from 0 to about 20.

13. The cheese slice of claim 12 wherein said hardened milk fat or hardened cream fat has an iodine value between about 3 and about 10, a melting point between about 105° F and about 115° F, and a softening point between about 40° F and about 44° F.

* * * * *